May 20, 1930.　　　C. E. FULLER　　　1,759,005
LOADING STATION AND DRIER CAR
Filed Sept. 20, 1928　　6 Sheets-Sheet 6
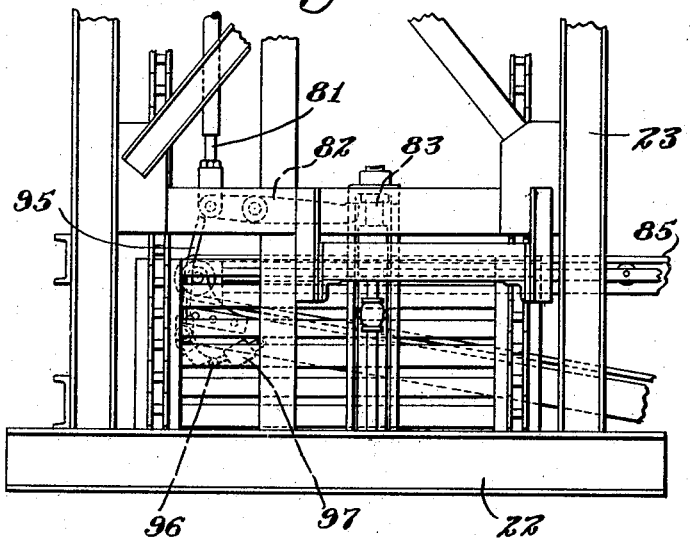
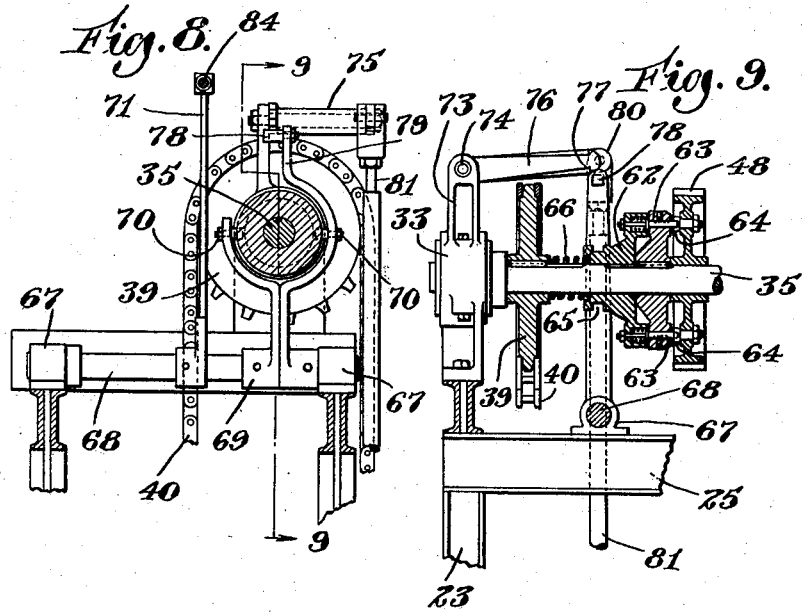
Inventor
Claud E. Fuller
by James A. Hodder
Attorney Patented May 20, 1930

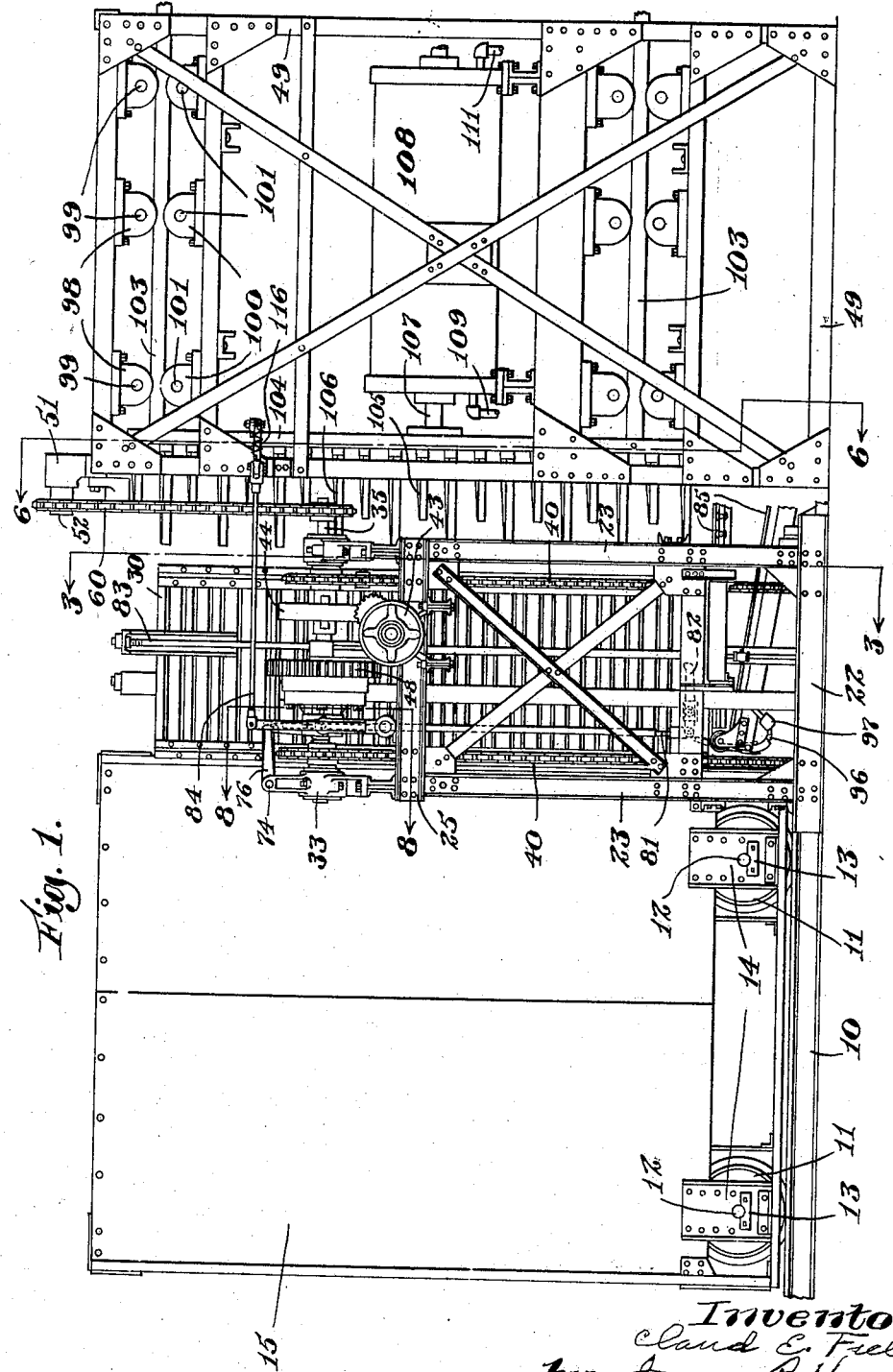

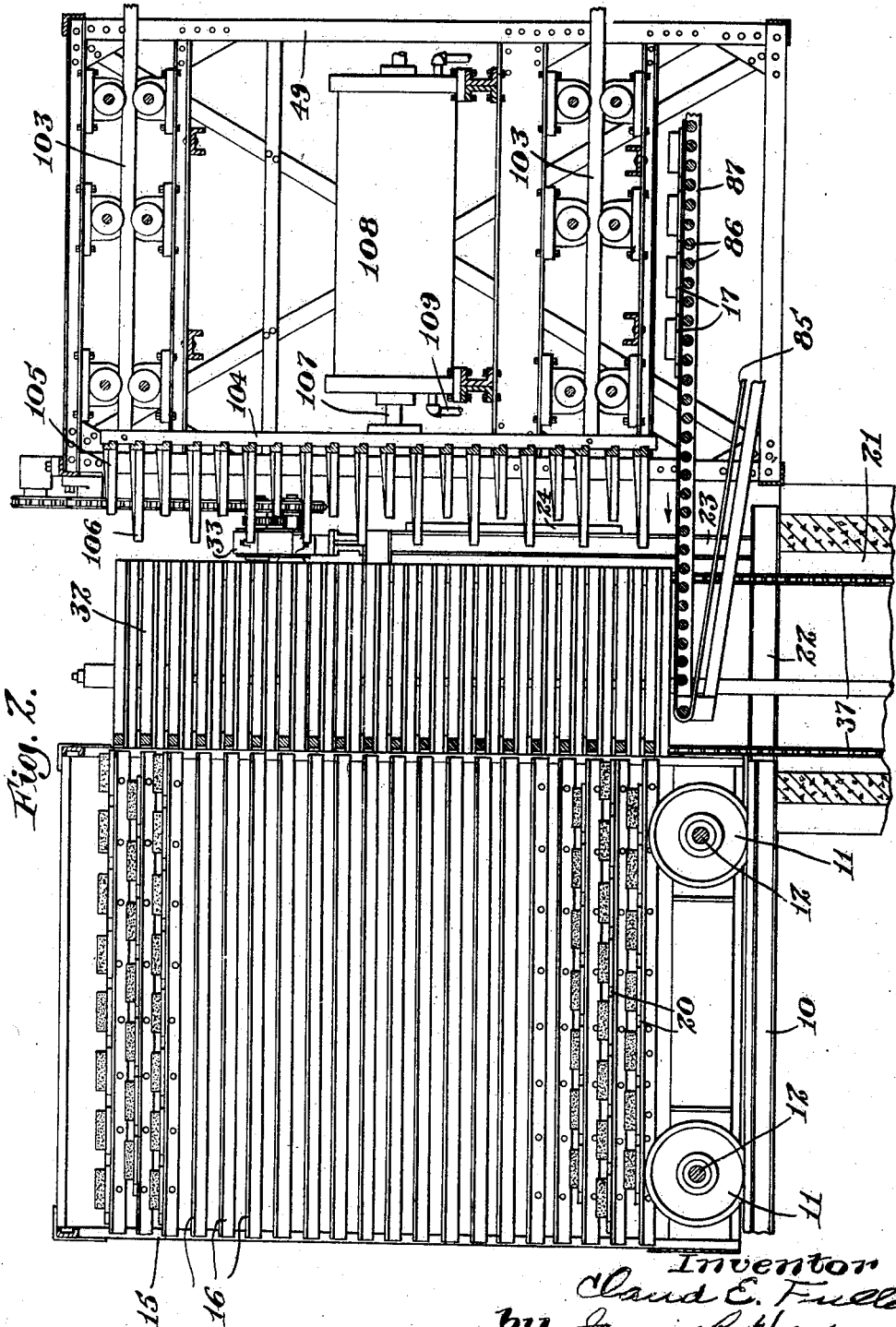

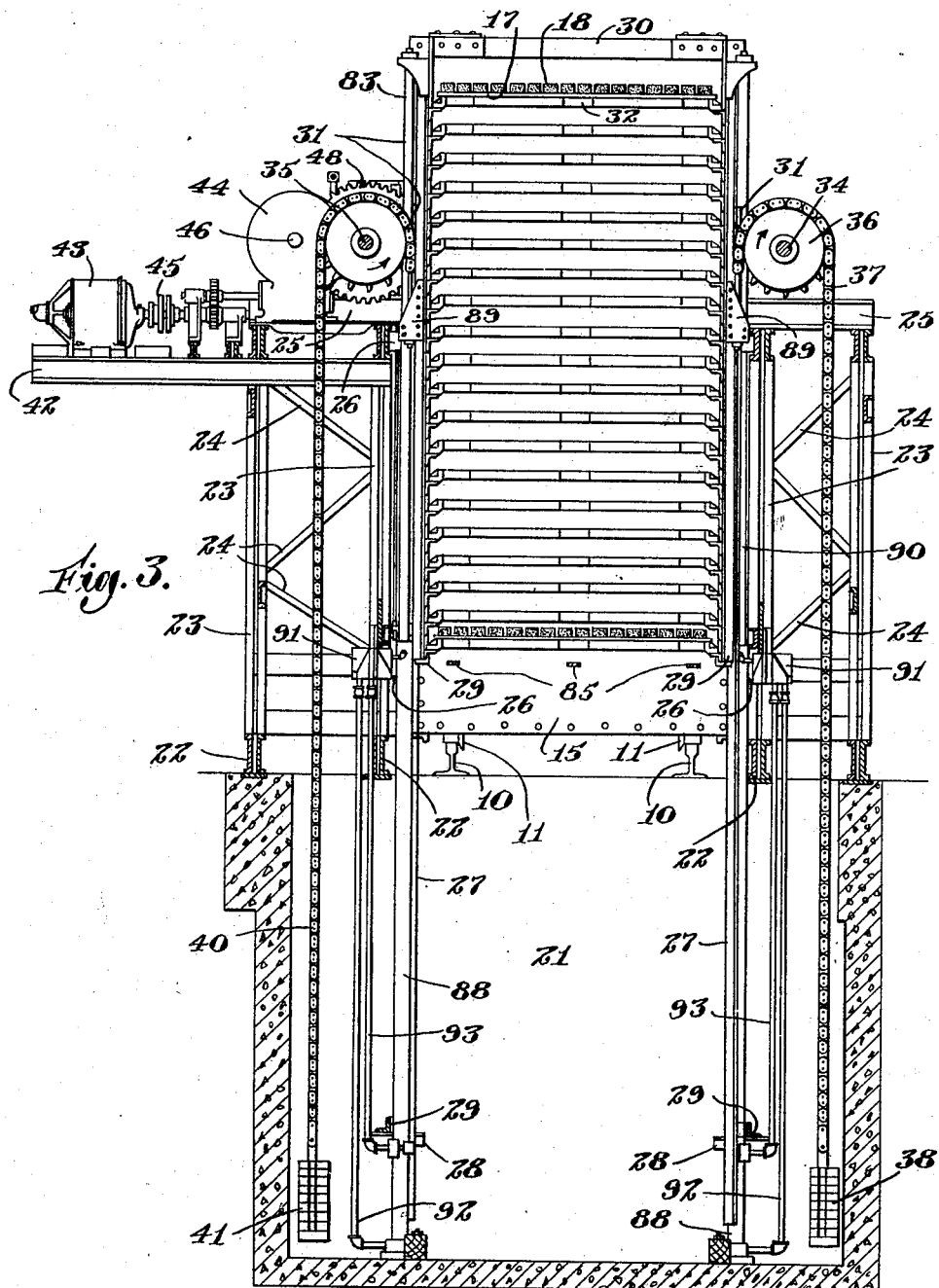

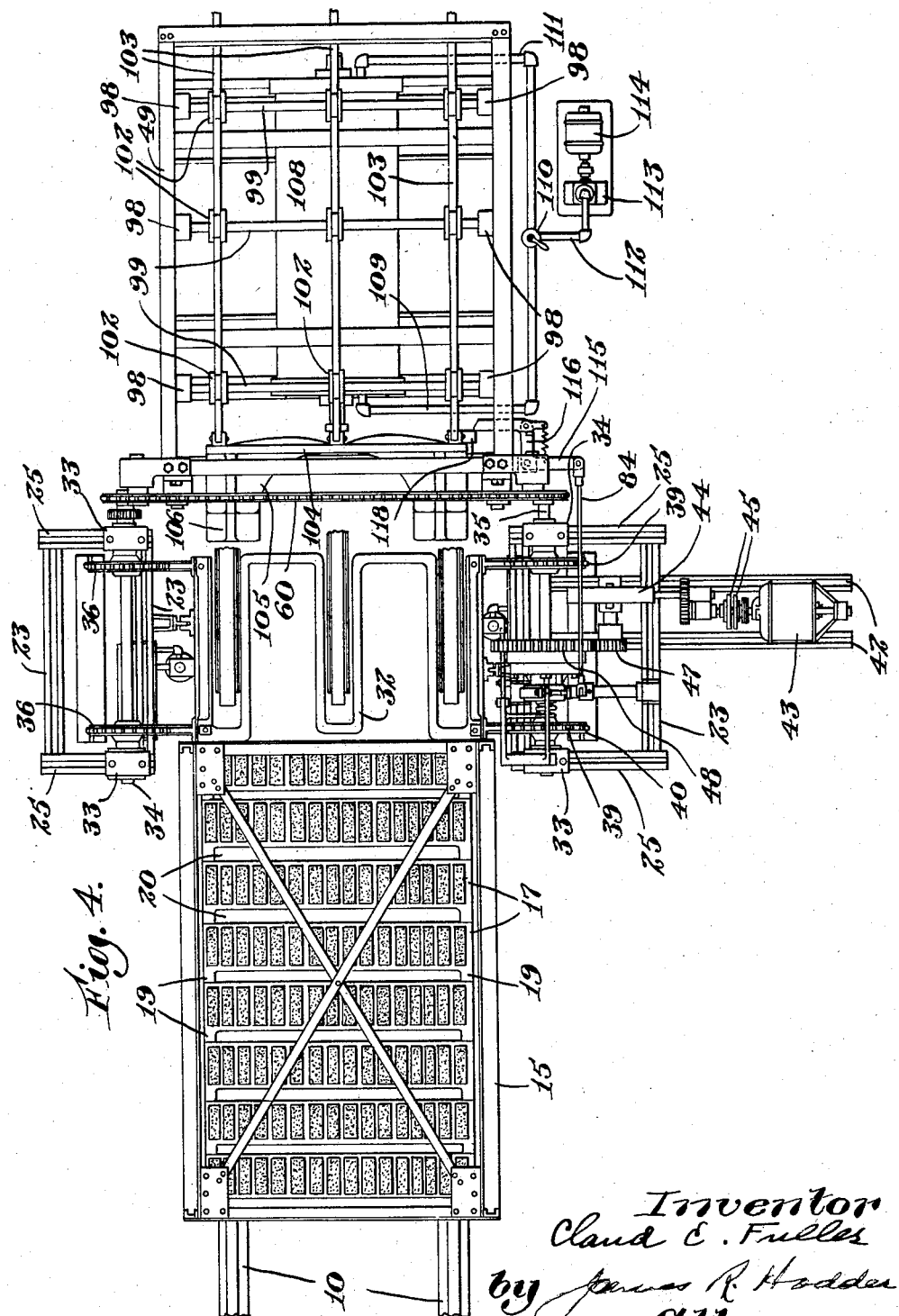

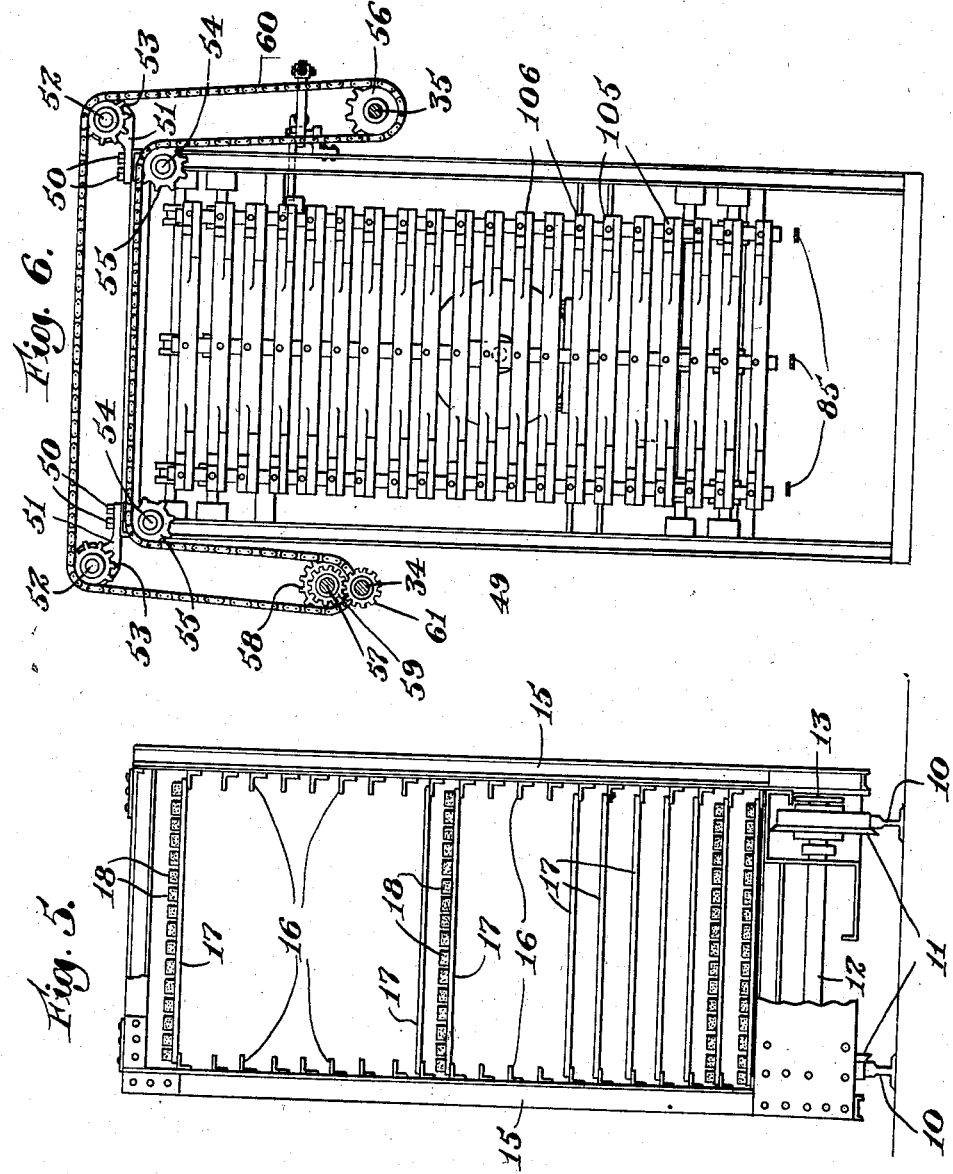

1,759,005

UNITED STATES PATENT OFFICE

CLAUD E. FULLER, OF NEW YORK, N. Y., ASSIGNOR TO NEW YORK BRICK HANDLING CORPORATION, OF NEW YORK, N. Y., A CORPORATION OF NEW YORK

LOADING STATION AND DRIER CAR

Application filed September 20, 1928. Serial No. 307,251.

My present invention relates to the manufacture of brick, and more particularly to an improved loading station and drying car for use in such manufacture.

In the manufacture of bricks, and particularly in the manufacture of bricks of the soft mud type, it is desirable, and in many cases essential, that the green brick be given a preliminary drying before they can be safely placed in hacked relation to each other or built into a kiln. The old type of air drying has been practically discarded at the present day, and two main types of driers have taken its place. Such types of driers are the pipe rack driers and drying in large ovens, the brick in this instance being placed in or on drier cars. In some stations, the pipe rack drier is the one to be desired, but in a large number of instances it is impossible to economically adopt a plan for the use of pipe rack driers and, therefore, the use of drier cars is imperative. The item of cost which has prevented the more rapid introduction of the use of drier cars is the cost of placing the loaded pallets in position in the drier car, and while various mechanisms have been devised for doing this operation mechanically, none of them, until the advent of applicant, have been successful.

A drier car should have as great a capacity as possible commensurate with ease of handling and the amount of time at the engineer's disposal for loading the drier car and placing it in position in the drying oven. To be most economical and to obtain as great a capacity as possible, there should be as many layers of pallets as can be conveniently handled and the pallets should be so constructed or so arranged relatively to each other and to the pallets in preceding and succeeding layers that passage of the drying air is permitted upward or downward through the layers of pallets. None of the devices in use at the present day have this desirable feature.

An important part of my present invention is the loading station by means of which a drier car may be economically and efficiently loaded with the desired number of pallets of green brick. In carrying out my invention, I utilize a drier car which may be of the usual rectangular shape, provided with a plurality of oppositely arranged angle members for supporting pallets of brick at the ends thereof, and am enabled to associate this drier car with a loading station capable of receiving a plurality of groups of loaded pallets in succession, the number of groups being equal to the number of pairs of oppositely arranged angle members in the drier car. Also associated with the improved loading apparatus is a mechanism for simultaneously ejecting from the loading apparatus and inserting in the drier car the plurality of groups of loaded pallets and such ejecting mechanism is capable of arranging the groups of loaded pallets in the drier car in staggered relation to each other, and in this connection, I employ a particular type of pallet which insures a sufficient air space between each adjacent pallet of each group so as to provide a free passageway for the heating and drying air from one layer to the other.

The principal object of my invention, therefore, is an improved heating station and drier car.

Another object of my invention is an improved automatically operable loading station.

A further object of my invention is an improved ejecting mechanism for loading a drier car.

A still further object of my invention is an improved mechanism for ejecting the loaded pallets from a loading station and placing them in a drier car in staggered relation to each other.

Other objects and novel features of the construction and arrangement of parts comprising my structure will appear as the description of the invention progresses.

In the accompanying drawings illustrating a preferred embodiment of my invention, Fig. 1 is a side elevation;

Fig. 2 is a longitudinal cross section view of Fig. 1;

Fig. 3 is a sectional end elevation on the line 3—3 of Fig. 1;

Fig. 4 is a plan view;

Fig. 5 is an end elevation of Fig. 1 looking to the right in said figure;

Fig. 6 is a sectional elevation on the line 6—6 of Fig. 1;

Fig. 7 is an enlarged elevation of a loading station shown in Fig. 1;

Fig. 8 is a sectional view on the line 8—8 of Fig. 1; and

Fig. 9 is a sectional view on the line 9—9 of Fig. 8.

Referring to the drawings, 10 designates a pair of tracks of any suitable size and intermediate length, and leading from the position shown in Fig. 1 to any desired position, such as a drying oven. These rails 10 are spaced apart from and arranged parallel to each other and on such rails run the flanged wheels 11. These flanged wheels 11 are arranged in pairs and each pair is attached to an axle 12 adjacent to each end thereof. The outer end of each axle 12 is rotatably mounted in a journal 13 secured to a carrying member 14. The carrying members 14 are in turn secured to a rectangular framework 15, the construction being such that the rectangular framework 15 together with the journal supports 14 are supported on the axles 12 which run on the rails 10. The rectangular framework 15 is provided with pairs of oppositely arranged angle members 16 on which may rest or be positioned the pallets 17, such pallets having thereon parallelly arranged green brick 18. The length of the rectangular frame 15 and, therefore, of the pairs of oppositely arranged angle members 16 is such that a plurality of pallets 17 may be placed on each pair, as clearly shown, for example, in Fig. 2.

Referring to Fig. 4, it will be noted that each pallet 17 is provided at each end of one side thereof with outwardly extending projections 19 and these projections 19 are sufficient to insure that when a plurality of pallets 17 are arranged on a pair of oppositely arranged angle members 16, for example, that an air space 20 of suitable length and breadth will be provided between each pair of pallets 17 and thus there will be provided ample space through which air may flow either upward or downward through the layers of pallets 17, as clearly shown in Fig. 2.

The rails 10 above described terminate adjacent to one edge of a pit 21 of suitable length, breadth and thickness, and any suitable means may be provided for securely clamping temporarily the rectangular framework 15 in proper position with regard to the length of the rails 12 or in a position shown, for example, in Figs. 1, 2, and 4. The sides and top of the pit 21 are preferably formed of reinforced concrete and anchored to the top face of the pit are structural iron base members 22. Secured to each of the structural iron base members 22 and extending upwardly therefrom and arranged parallel to each other are rectangular members 23, also of structural framework, and from an inspection of Fig. 3, it will be obvious that such rectangular structures 23 are arranged in pairs, two on either side of the pit 21, and that each pair on each side of the pit 21 are tied together by angle members 24 as is usual in this type of construction. On the top of each pair of rectangular frames 23, and extending therebetween, are supporting members 25, also of structural metal shapes. Secured to the inner side of the inner rectangular members 23, adjacent to the top and bottom thereof, are supporting members 26, the supporting members 26 on each rectangular frame 23 being in alinement with each other and secured to these supports are T-iron guides 27. The T-iron guides 27 extend downwardly into the pit 21 and secured to the walls of the pit 21 are angles 28 and to which are secured cross angles 29. The cross angles 29 are utilized to support in fixed position the lower ends of the T-slides 27. 30 designates as an entirety a rectangular framework provided on each side with a pair of V-members 31 which engage with the T-slides 27 and constrain the rectangular frame 30 to move vertically upward or downward with respect to the pit 21 in a fixed path. The rectangular framework 30 is provided with a plurality of superimposed supporting members 32 on which may be supported the pallets 17 carrying the green brick 18. The supports 30 have the shape in plan as indicated in Fig. 4 in order to allow sufficient clearance for mechanism to be hereinafter described. There are as many supporting members 32 in the rectangular frame 30 as there are pairs of oppositely arranged angle members 16 in the drier car above described, and the distance between adjacent supporting members 32 is equal to the distance between adjacent pairs of angle members 16. Secured to the top of each of the transverse members 25 and in alinement with each other, are bearings 33. In the pair of bearings on the transverse members 25 at the right of the structure, as viewed in Fig. 3, is rotatably mounted a shaft 34, while in the pair of bearings 33 on the transverse members 25 to the left, as viewed in Fig. 3, is rotatably mounted a shaft 35. Secured to the shaft 34 intermediate the ends thereof and adjacent to each of the bearings 33, are sprockets 36, these sprockets being equal in diameter and pitch and over each of the sprockets runs a sprocket chain 37. One end of the sprocket chains 37 are secured to the side of the rectangular framework 30 and the other end extends downwardly into the pit 21 and has secured at its lower end a counter weight 38. Also secured to the shaft 35, intermediate the ends thereof, and adjacent to the pair of bearings 33, are sprockets 39, these sprockets being equal in pitch and diameter and also equal in pitch and diameter to the pitch and diameter of the sprockets 36. Over the sprockets 39 run sprocket chains 40, one end of such sprocket chains being attached to the side of the rectangular framework 30, while the other end extends downwardly into the pit 21 and has secured at its end a counter weight 41.

Secured to the rectangular frame members 23 to the left of the structure, as viewed in Fig. 3, and lying parallel to the transverse members 25, are structural members 42, such structure members forming a support for a driving mechanism for the rectangular structure 30. Mounted on the members 42, therefore, is a motor 43 of suitable size and characteristics and which is adapted to be operated at a constant speed. Also mounted on the members 42 is a worm and worm wheel unit 44 which is adapted to be intermittently connected to the driving motor 43 by a magnetic clutch 45. On the shaft 46 of the worm and worm wheel unit 44 is secured a pinion 47 which meshes with and drives a gear 48 secured to the shaft 34. 49 designates a framework which will be described in detail later, such framework being located adjacent to the structure just above described and at the side of the pit 21 opposite from the tracks 10. On the top of the framework 49 and on each side thereof are secured by bolts 50 bearing members 51, these bearing members being in alinement with each other, and having secured therein stub shafts 52. These stub shafts 52 are arranged parallel to each other and rotatably mounted on each of the stub shafts is an idler sprocket wheel 53. Therefore, the sprocket wheels 53 are in alinement with each other. Also secured to the framework 49, beneath the bearing members 51, are stub shafts 54, these stub shafts being arranged parallel to each other and to the stub shafts 52. Rotatably mounted on the stub shafts 54 are idler sprocket wheels 55, which sprocket wheels are in alinement with each other and with the sprocket wheels 53. Secured to the shaft 35, is a sprocket wheel 56, which is in alinement with the sprocket wheels 53 and 55 above described. Secured to one of the bearing members 33, carrying the shaft 34, is a stub shaft 57, and rotatably mounted on such stub shaft 57 is a sleeve having formed at one end thereof a sprocket wheel 58, and at the other end a gear 59. The sprocket wheel 58 is in alinement with the sprocket wheels 53, 55 and 56, and over the side of sprocket wheels above described runs an endless sprocket chain 60. Secured to the shaft 34 is a gear 61, equal in diameter and pitch to the gear 59 and meshing with such gear so as to be driven thereby. Power is transmitted from the shaft 35 to the shaft 34 by the sprocket chain 60 above described and by the gears 59 and 61 and the arrangement is such that the shafts 35 and 34 rotate at the same angular speed and in opposite directions. Therefore, operation of the magnetic clutch 45 to connect the driving motor 43 to the shafts 34 and 35 will cause a rotative movement of such shafts 34 and 35 in a direction to lift the rectangular framework 30 out of the pit 21 or will rotate in the direction of the arrow shown in Fig. 3. The gear 48 has been described as being connected to the shaft 35 but this connection is through mechanism that may be utilized to allow the shaft 35 to rotate independently of such gear 48.

Referring to Figs. 8 and 9, it will be seen that the gear 48 is, in fact, rotatably mounted on the shaft 35 and slidably mounted on such shaft 35, though rotatable therewith, is a member 62. This member 62 is provided with a plurality of spring pressed slidably mounted plungers 63 that engage in lugs 64 on the gear 48, and at its other end is provided with an annular groove 65. Between the end of the member 62, in which is formed the annular groove 65 and the sprocket 39, is located a coil spring 66 which tends to urge the member 62 to the right, as shown in Fig. 9 and bring the pin 63 into engagement with the lugs 64 and, therefore, cause a connection between the shaft 35 and the gear 48. Secured to the top surface of the transverse members 25 are bearings 67, such bearings being in alinement with each other, and in such alined bearings is rotatably mounted a shaft 68. Secured to the shaft 68 is a member 69 which partially encircles the member 62 and is provided with inwardly extending members 70, which extend into the annular groove 65 in such member 62. Also secured to the shaft 68 is a lever 71 and by means of which the shaft 68 may be rotated to allow the member 69 and pins 70 to force the members 62 to the left, as shown in Fig. 9, against the compression of the spring 66 and thus to force the pins 63 out of engagement with the lug 64 on the gear 48. Such action will have the effect of allowing the weight of the rectangular framework 30 to rotate the shafts 34 and 35 in the reverse direction to that shown in the arrows in Fig. 3 and will allow the rectangular framework 30 to sink to the bottom of the pit 21. Formed on the bearing member 33 adjacent to the member 62, as shown in Fig. 9, is an upwardly extending bearing strut 73 having secured therein a shaft 74. Rotatably mounted on the shaft 74 is a sleeve 75 provided at one end with a radially extending arm 76 that is provided on its outer end with a notch 77. This notch 77 is adapted to engage with a locking bar 78 secured to the upper end of a member 79 that is formed integral with one of the arms of the member 69. It is obvious, therefore, that if the lever 71 is so operated as to move the member 62 to the left, as viewed in Fig. 9, against the compression of the spring 66, that the notch 77 will engage with the locking bolt 78 and will maintain the pin 63 out of engagement with the lug 64 on the gear 48. Also secured to or formed integral with the sleeve 75 and extending radially outward therefrom is a member 80 to which is pivotally attached the upper end of an operating rod 81. The lower end of this rod 81 is pivotally attached to one end of a lever 82 that is pivotally mounted on one of the frame members 23 adjacent the lower end thereof. The other end of the lever 82 extends outwardly into the path of movement of a member 83 secured to the rectangular framework 30 adjacent to the top thereof. Therefore, when the rectangular framework 30 sinks into the bottom of the pit 21, the member 83 thereon engaging with the lever 82 will force the operating rod 81 upwardly, thus rotating the sleeve 75 on the shaft 74 in a counterclockwise direction and lifting the notch 77 on the arm 76 out of engagement with the locking bar 78, whereupon the spring 66 will force the member 62 to the right, as shown in Fig. 9 and bringing the pin 63 into engagement with the lugs 64 on the gear 48. Attached to the upper end of the lever 71 is an operating arm 84 which will be hereinafter described in detail.

The weight of the rectangular framework 30 and associated supporting members 32 is considerably greater than the weight of the counter-weights 38 and 41 and, therefore, when the gear 48 is released from the shaft 35, the momentum of the rectangular framework 30 might possibly be great enough to do considerable damage to the structure when the rectangular framework reached the bottom of the pit 21. To guard against any such contingency, I have associated with the rectangular framework 30 an hydraulic buffer attachment. Such attachment comprises vertically arranged tubular members 88, on each side of the rectangular frame-work 30, such tubular members being closed at their bottom ends and supported in any suitable manner at the bottom of the pit 21. Secured to each side of the rectangular frame-work 30 on brackets 89 are piston rods 90, such piston rods extending into the tubular members 88 and being provided at their lower ends with the usual piston. Associated with each tubular member 88 is a storage tank 91. Connected to the lower end of each tubular member 88 is a pipe 92, such pipe, in turn, being connected at its upper end to the tank 91. Also connected to the tubular member 88, at a point spaced above the entrance of the tube 92, is a second tubular member 93, and such tubular member is connected at its upper end with a tank 91. As the rectangular framework 30, with its ever-increasing load of loaded pallets 17 is moved upward out of the pit 21, as viewed in Fig. 3, fluid will flow from the tanks 91 into the tubular members 88 below the pistons connected to the piston rods 90. When the lever 71 is operated so as to cause the disconnection of the gear 48 from the shaft 35, it is obvious that the rectangular framework 30 may be moved downward and at a fairly rapid speed because of the fact that the tubular members 88 are each provided with two outlets leading to the respective tanks 91, that is, the conduits 92 and 93. The first drop of the rectangular framework 30 will, therefore, be relatively rapid and such motion will continue until the pistons attached to the piston rods 90 passes the opening of the conduits 93. At this point, it is obvious that the motion of the rectangular framework 30 will be considerably slowed down because of the fact that there is now but one exit from the tubular member 88 for the fluid contained therein—that is, there now remains only the conduit 92 through which the fluid flows from the tubular member 88 into the tanks 91.

Associated with the rectangular framework 30 is an endless conveyor 85, the upper reach of which is supported in a substantially horizontal plane by a plurality of closely spaced and parallelly arranged idler rolls 86 rotatably mounted on a framework 87. This endless conveyor 85 delivers the loaded pallets 17 in groups of four, as shown in Fig. 2. When the framework 30 is in its lowermost position, it will be assumed that the upper supporting member 32 will be in correct position to receive the on-coming group of loaded pallets 17.

Pivotally attached to one of the rectangular frameworks 23 is an operating lever 95, one end of which lies in the path of movement of the oncoming group of loaded pallets 17. The other arm of such lever 95 is adapted to engage with the pivoted arm 96 of a controlling switch 97, from which controlling switch suitable connections (not shown) extend to the magnetic clutch 45. The lever 95, being rotated about its pivot point in a counterclockwise direction by the engagement therewith of the on-coming group of loaded pallets 17, will so move the pivoted switch lever 96 as to close the energizing circuit for such magnetic clutch 45 and will maintain this circuit closed only as long as the pallet 17 is in engagement with the upper arm of the lever 95. Energization of the magnetic clutch 45 connects the constantly operating motor 43 with the driving mechanism just described, and a simultaneous rotative movement of the shafts 34 and 35 takes place to cause a lifting of the rectangular framework 30. This lifting movement will continue until the pallet 17, engaging the arm of the pivoted lever 95, moves upward out of engagement therewith, whereupon the lever 95 returns automatically to its initial position, and also the switch lever 96 returns to its initial position, breaking a circuit at the controlling switch 97 and de-energizing the magnetic clutch 45. The rectangular framework 30 thereupon instantly stops and the length of the arm of the pivoted lever 95 is so proportioned that the engaging pallet 17 will ride off the same at a time when the next succeeding lower supporting member 32 of the rectangular framework 30 comes into proper alinement with the upper reach of the endless conveyor 85. The distance between groups of pallets 17 is such that the proper upward movement of the rectangular frame 30 may take place without danger of deranging the mechanism. Also, such upward intermittent movement will take place as long as groups of pallets 17 are fed thereto by the endless conveyor 85.

The rectangular framework heretofore referred to is located adjacent the end of the pit 21 remote from the tracks 10 and is provided adjacent to the top and on opposite sides with bearings 98, such bearings 98 being arranged in pairs and in each pair is rotatably mounted a shaft 99. For convenience in construction, I have provided three such shafts 99 and such shafts are arranged parallel to each other and distributed along the length of the rectangular frame 99. Immediately below each of the bearings 98 is a corresponding bearing 100, these bearings being likewise arranged in pairs, and in each pair is rotatably mounted a shaft 101. The shafts 101 are each arranged parallel to the shafts 99 and below and parallel to its associated shaft 99. On each of the shafts 99 and 101 is secured a plurality of grooved pulleys 102 spaced along the length of such shafts 99 and 101. The grooved pulleys 102 are thus arranged in groups of two with a plurality of groups of two in alinement with each other and define a guideway in which is rotatably or slidably mounted a bar 103 of indeterminate length. There are thus (as will be clearly obvious from an inspection of Fig. 4) a plurality of such bars 103 arranged parallel to each other. Adjacent to the lower end of the rectangular frame 49 but above the endless conveyor 85, is arranged a structure identical with that just described and the rectangular bars associated with such structure are therefore designated by the same reference character 103. There are thus provided two groups of three parallelly arranged bars 103 of indeterminate length and secured to the front ends—or the ends adjacent the pit 21—of the bars 103 is a rectangular frame 104, and secured to the rectangular frame 104 are a plurality of pushing members 105 and 106 respectively, such pushing members being alternately and parallelly arranged with respect to each other, and the pushing members 105 are shorter in length than the pushing members 106, as will be obvious from an inspection of Fig. 2. There are as many pushing members 105 and 106 combined as there are supporting members 32 in the rectangular framework 30 and, therefore, it will be obvious that if the supporting members 32 have placed thereon groups of four pallets 17 each, and such supporting members are in their uppermost position, that if the pushing bars 103 are moved to the left, as shown in Fig. 2, so as to bring the pushing bars 105 and 106 into engagement with the alined groups of pallets 17, then when the bars 103 have come to their outermost position or position to the left in Fig. 2, that the outer ends of the plurality of groups of pallets 17 will be arranged in structure relation. Secured to the rear face of the rectangular framework 104 at approximately the geometric center thereof is one end of a piston rod 107, which piston rod has attached thereto at the other end thereof a piston (not shown) which works on the interior of a cylinder 108. The front or left-hand end of the cylinder 108 is connected by conduit 109 with a three-way valve 110, while the right-hand end of such cylinder is connected by a conduit 111 to the same three-way valve 110. The three-way valve 110 is connected by conduit 112 with a fluid pump 113 operated by motor 114 and which keeps a constant pressure of either air, water, or any other suitable fluid, under control of the operator by means of the three-way valve 110. It is obvious, therefore, that the operator may, by proper manipulation of the three-way valve 110, supply fluid under pressure to either the right-hand or left-hand side of the piston above referred to, so as to move the rectangular framework 104 carrying the pusher bars 105 and 106 to the left or right, as desired, it being assumed that the above directions are taken with respect to the showing in Fig. 2.

Mounted on the framework 49 is a bell crank lever 115, one arm of which is pivotally attached to the operating rod 84 above referred to, while the other arm has pivotally attached thereto a lever 116. This lever 116 is so mounted on the arm of the bell crank lever 115 as to have unlimited pivotal movement in one direction about its pivot point, and a limited pivotal movement in the other direction. The outer free end of the lever 116 is bevelled and lies in the path of movement of the member 118 fixed to the rectangular frame 104. Forward movement, or movement to the left, as shown in Figs. 2 and 4 of the rectangular framework 104 will act simply to cause a pivotal movement of the lever 116 and such pivotal movement will have no effect on the bell crank lever 115 or on the operating rod 84. Therefore, the pusher bars 105 and 106 may be moved to the left, as shown in Figs. 2 and 4, so as to push the loaded pallets 17 off the supporting members 32 and into the drier car. When, however, the rectangular frame 104 is moved to the right, as shown in Figs. 2 and 4, the member 118 carried thereby will engage with the free end of the lever 116, when the pusher bars 105 and 106 have practically reached their initial position and are out of association with the rectangular framework 30 or the supporting members 32 mounted therein. This engagement of the member 118 with the lever 116 will cause a rotative movement of the bell crank lever 115 about its pivot point in a clockwise direction and, therefore, a rotative movement of the lever 71. This, as above described, causes a rotative movement of the shaft 68 and the forked member 69 will, by reason of the pin 70 therein engaging in the annular groove 65, move the member 62 to the left, as shown in Fig. 9, against the tension of the spring 66, so as to release the pin 63 from the lug 64 of the gear 48 and will bring the locking bar 78 into position to be engaged by the notch 77 in the lever 76. Therefore, the shafts 34 and 35 are disconnected from the driving mechanism 44 above described and the weight of the rectangular frame 30 with associated supporting members 32 will cause a downward movement of such mechanism into the pit 21. The movement will be accelerated until such time as the pistons attached to the shaft 90 cut off or move past the opening of the tubular members 93 and the downward movement of the rectangular frame 30 will be decelerated and the framework brought to rest in its original and lowermost position. When the rectangular frame reaches its lowermost position, the member 83 thereon will engage with the outer free end of the pivoted member 82 and will thus cause an upward movement of the rod 81, such movement, in turn, causing, by means of the lever 80, a rotative movement of the sleeve 75 and therefore an upward movement of the outer end of the lever 76, thus disconnecting the notch 77 thereon from the locking bar 78, whereupon the spring 66 will force the member 62 to the right and cause an engagement of the pin 63 thereon with the lug 64 on the gear 48.

The capacity of each of the supporting members 32 is four loaded pallets 17 and this limit to the capacity is for convenience in manufacture and handling. It is more convenient, however, to have a greater number than four pallets 17 in each layer in the drier car and, therefore, the length of each pair of oppositely arranged angle members 16 is eight loaded pallets 17. It will be obvious therefore that the above cycle of operations with respect to the loading of the supporting members 32 in the rectangular frame 30 and the operation of the pushing bars 105 and 106 will have to be duplicated in order to complete the loading of the drier car. On the first operation of the pushing bars 105 and 106, the loaded pallets 17 will, therefore, be pushed into a position in the drier car that is temporary, and on the second operation of such pushing bars 105 and 106, the second load of loaded pallets will be pushed into the drier car, and such second load will push the first load into final loading position and both loads will then assume the position shown in Fig. 2, and from an inspection of such figure, it will be noted that each succeeding brick of each succeeding layer will be arranged above a space between bricks in the preceding layer, and also that because of the construction of the pallets 17, there is provided a zig-zag path for the drying fluid, such as heated air, whether such air passes in at the top of the drier car or out at the bottom, or vice versa. Each brick, therefore, is subjected to the action of a moving column of air, and each brick is given an equal opportunity for drying.

While I have necessarily described the preferred embodiment of my invention somewhat in detail, it is to be understood that I may vary the size, shape, and arrangement of parts within wide limits without departing from the spirit of the invention.

Having thus described my invention, what I claim as new is:

1. In a device of the kind described, the combination with a carrier, operating means therefor, a device for delivering a plurality of groups of articles in succession to the carrier, means operable by each group of articles as they are delivered to the carrier for operating the control means for such carrier to move the same vertically through a predetermined distance, reciprocating means movable in one direction for simultaneously removing all of the groups of articles from the carrier, and movable in the other direction out of association with the carrier, and means operable by the reciprocating means on the return thereof out of association with the carrier for disengaging the carrier operating means and permitting the return of the carrier to normal position.

2. In a device of the kind described, the combination with a carrier, means for moving said carrier vertically upward step-by-step to a predetermined distance at each step, means associated therewith for moving the same back to its initial position, a conveying means associated with the carrier and arranged to deliver groups of articles to the carrier, controlling means for the carrier operable by engagement of the articles to be carried therewith and to be maintained in operable position for a predetermined length of time, a drier car associated with the exit end of said carrier, a discharging means for said carrier operable to simultaneously remove the plurality of groups of articles from the carrier and arrange said groups in staggered relation to each other, and controlling means for the carrier operable on the return of the discharging means to normal position to disconnect the means for moving the carrier upward and for permitting the operation of the means for moving the carrier to its initial position.

3. In a device of the kind described, the combination of a carrier, a plurality of superimposed shelves therein for receiving articles of manufacture, a conveying device associated with the carrier and arranged to deliver a plurality of groups of articles of manufacture to the superimposed shelves in succession, controlling means for moving the carrier intermittently step-by-step in an upward direction controlled by the articles of manufacture, means associated with the carrier for moving the same back to its initial position, a drier car associated with the exit end of said carrier, a discharging device for said carrier located at the end thereof remote from the drier car, an hydraulic means for operating said discharging device, whereby the plurality of groups of articles in the carrier are simultaneously removed therefrom and placed in the drier car, and means operable on the return of the discharging device to normal position to disconnect the means for moving the carrier upward and for permitting the operation of the means for moving the carrier to its initial position.

In testimony whereof, I have signed my name to this specification.

CLAUD E. FULLER.